US005750240A

United States Patent [19]

Findley et al.

[11] Patent Number: 5,750,240

[45] * Date of Patent: May 12, 1998

[54] COATING OF SURFACES OF ARTICLES

[75] Inventors: Philip Findley, Linton; Keith Mortimer, Wooley; David Marshall, Tealby, all of United Kingdom

[73] Assignee: Technoflex Innovations Limited, United Kingdom

[21] Appl. No.: 863,777

[22] Filed: May 27, 1997

Related U.S. Application Data

[63] Continuation of Ser. No. 341,643, Nov. 17, 1994, abandoned.

[30] Foreign Application Priority Data

May 17, 1994 [GB] United Kingdom .................. 9409813
Jun. 28, 1994 [GB] United Kingdom .................. 9412921

[51] Int. Cl.[6] .................. B32B 3/00

[52] U.S. Cl. .................. 428/195; 428/42.1; 428/76; 428/174; 428/204; 428/411.1; 428/488.4; 428/500; 428/520; 428/914

[58] Field of Search .................. 438/195, 42.5, 438/76, 174, 204, 411.1, 488.4, 914, 500, 520; 156/245

[56] References Cited

U.S. PATENT DOCUMENTS 4,125,653 11/1978 Muzik .................. 428/40
4,721,635 1/1988 Helinski .................. 428/15
5,366,791 11/1994 Carr et al. .................. 428/195
5,413,840 5/1995 Mizuno .................. 428/195

*Primary Examiner*—William Krynski
*Attorney, Agent, or Firm*—Head, Johnson & Kachigian

[57] ABSTRACT

The invention relates to the field of providing coatings for articles, said coatings provided to enhance the visual appearance of the articles such as doors, for furniture, sporting goods and in general any articles where the appearance can be enhanced by providing a coating thereon. Typically the coatings can be provided to give the appearance that the article has been manufactured from a more expensive material, to provide advertising material thereon or generally to provide a more pleasing appearance to the eye. The invention provides a coating formed of a plastic sheet material to which has been applied at least one ink pattern which is viewable and said ink pattern is applied and the sheet material is of sufficient flexibility to enhance the appearance of the article and also to mimic the effect of contour changes of the articles. There is also provided a method of manufacturing the coating of the invention and of applying the coating to the article and provides a coating which is both novel over known coating types and provides increased flexibility and scope of visual and/or tactile effects which can be created.

13 Claims, 2 Drawing Sheets

COATING OF SURFACES OF ARTICLES

This application is a continuation of application Ser. No. 08/341,643 filed on Nov. 17, 1994, now abandoned.

BACKGROUND OF THE INVENTION

1. Field of the Invention

The present invention relates to the coating of surfaces of articles to produce a surface effect and finish which is decorative and protective when applied to the article. Typically, but not exclusively, the articles to be coated are surfaces of items of furniture such as doors, kitchen units, work surfaces and such like, but in generally any article where the application of a coating having a certain appearance would be beneficial to the appearance of the article.

2. Prior Art

At present, and with reference to kitchen unit doors by means of example only, the doors are manufactured from medium density fibre (MDF) or another cheap material and then coated to provide an effect which mimics, for example, a wood grain finish or combinations of colors and patterns. The coating then gives the effect that the article has been manufactured from a more expensive material or gives the article a more desirable appearance in terms of color or pattern. This coating process is used on articles ranging from articles of furniture through to sporting goods.

In a first known method, the coating comprises a sheet plastic material which acts as a base and onto which are applied second, third or fourth layers of polyvinyl chloride (PVC) sheets. The second and subsequent layers are provided in different colors and/or are embossed to produce a tactile surface effect. In one embodiment a second layer of PVC material is provided which is of a different color than the first. Part of the second layer is then removed by routing to leave a coating with an external finish of two colors and typically having a border which is the color of the first layer surrounding the second layer.

The layers of plastics sheet material are typically applied to the article by means of applying a layer of adhesive to either or both of the plastics sheet material and the article.

Alternatively a coating known as a veneer is applied to the article. The range of surface finishes which can be achieved using veneers is limited and particularly related to the creation of effects which mimic particular types of wood grains. Again the veneer is applied by adhesive but the same are relatively inflexible and cannot easily be applied to curved or indented surfaces.

A further coating method is to form a length of plastics sheet material onto which a continuous pattern is printed or embossed. The length of sheet material is then cut to the required shapes of the articles to which the same is to be applied. This coating causes wastage in the form of the cut off sheet material and furthermore the surface effect achieved is limited, repetitive and relatively simplistic due to the continuous printing requirements.

While each of the above coating systems are used extensively in an extremely large marketplace, all are regarded as being relatively expensive and inflexible in the range of uses and the effects which can be provided. For example, and with regard to the use of multi-layered PVC sheets, the requirement to use layers of sheets to provide the required surface effect is costly and still provides only a limited effect, and no complex design effects can currently be created on existing coatings.

The aim of the present invention is to provide a coating for application to the surface of an article which can be produced and adapted to provide a plurality of surface finish effects of considerable complexity.

SUMMARY OF THE INVENTION

The present invention provides a coating for application to a surface of an article to form an externally facing surface of the same, said coating in the form of a sheet of plastics material wherein there is applied to at least one face of the sheet, at least one ink pattern, said sheet applied to adhere to the surface of the article with the ink pattern viewable.

Typically, there is applied to the sheet a plurality of different ink patterns which can be of different colors and which, when combined, form the viewable pattern.

Preferably a protective layer such as a layer of lacquer is applied over the viewable pattern to protect the same from damage.

Preferably, the plastics material is of a thickness which is in a range of 200 to 500 microns and is sufficiently flexible to allow the sheet to be fitted into the contours of the surface of the article to be taken into account. The plastics material can be PVC, styrene, or other suitable plastics material.

In one embodiment, the sheet is applied to the surface of the article in register therewith and the viewable pattern applied to the sheet is provided to mimic the effect of the contour changes on the surface of the article. For example, if the surface includes indents the pattern includes shaded areas which, when fitted, match with the indents.

The ink patterns, if applied to the outer surface of the coating, also create an embossed effect and, if required, the sheet material is embossed to produce a tactile effect in addition to the viewable pattern.

Typically, the coating is applied to the surface of an article of furniture.

The sheet material is any of PVC, styrene or any other suitable plastics sheet material and the sheet material can be of any color or can be substantially transparent. When the sheet material is colored the appropriate color is selected to minimize the requirement for subsequent ink pattern application.

When the sheet material is transparent, the ink pattern is printed on either or both of the outer and/or inner faces of the sheet. When the ink pattern is applied to the inner face the sheet acts as a protective barrier while allowing the pattern to be viewed through the same. When the sheet is transparent the color of the article to which the same is applied is used as an integral part of the viewable pattern created.

In a further aspect of the invention there is provided a method for forming a coating for the surface of an article comprising selecting a sheet of plastics material of a required form and applying to a face of said sheet at least one ink pattern by printing.

Typically, an ink of a first color is applied to the sheet material in a first position followed by the application of an ink of a second color in a second pattern and, if required, successive ink patterns can be applied thereafter to produce the desired viewable pattern.

In one embodiment, the ink patterns are applied by a screen printing process but the patterns may equally be applied by litho, flexo printing techniques or ink or bubble jet printing processes.

Such surface finish effects are any of a wood grain, colored areas or patterns or advertising material.

In a further aspect of the invention there is provided a method of coating an article comprising selecting a sheet of plastics material of required form, printing at least one ink pattern on surface thereof, applying an adhesive layer either before or after applying the ink pattern, to the rear surface of said plastics sheet and/or the surface of the article to be coated; applying the coating to the article by pressing the same onto the article and applying heat to soften the sheet material and adhesive and cause the same to adhere to the article.

In one embodiment, the sheet material is cut to the required size prior to the application of ink patterns thereto.

Typically, the coating and the article are placed in a mold which has the shape of the external surface of said article and the mold presses the coating into contact and ensures that the coating is in register with the article and adheres to all the required areas of the same. Typically, magnetic clamping means are used to hold the sheet and article in register. Preferably the article is raised to allow the sheet coating to be wrapped around the edges thereof to provide a compete coating effect.

DETAILED DESCRIPTION OF THE PREFERRED EMBODIMENTS

Figure 1:
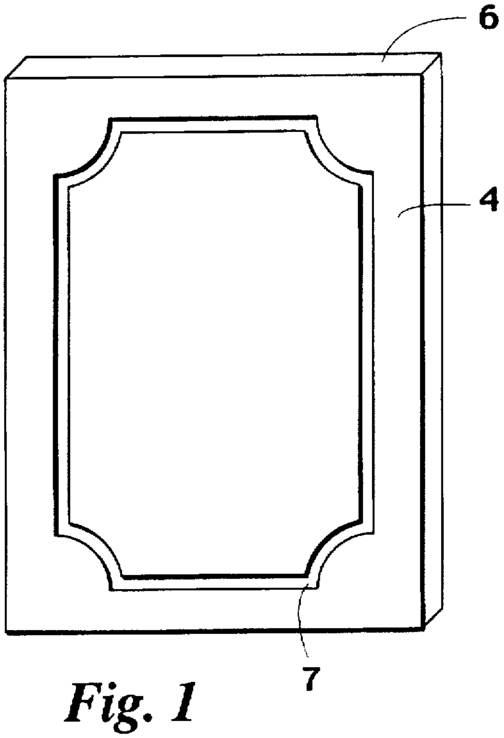
FIG. 1 illustrates an article to which a coating of the invention is applied.

The article to which a coating 2 is to be applied in the first embodiment of FIG. 1 is the external surface 4 of a door cabinet which is manufactured from MDF. In this case, the coating is required to give the effect that the door has been manufactured from the construction of pieces of wood by carpentry to provide the outer surface of the door with a wood grain effect.

The door 6 is manufactured from MDF using standard manufacturing processes and is provided with an indented section 7 which adds to the visual effect of the door 6.

Figure 2:
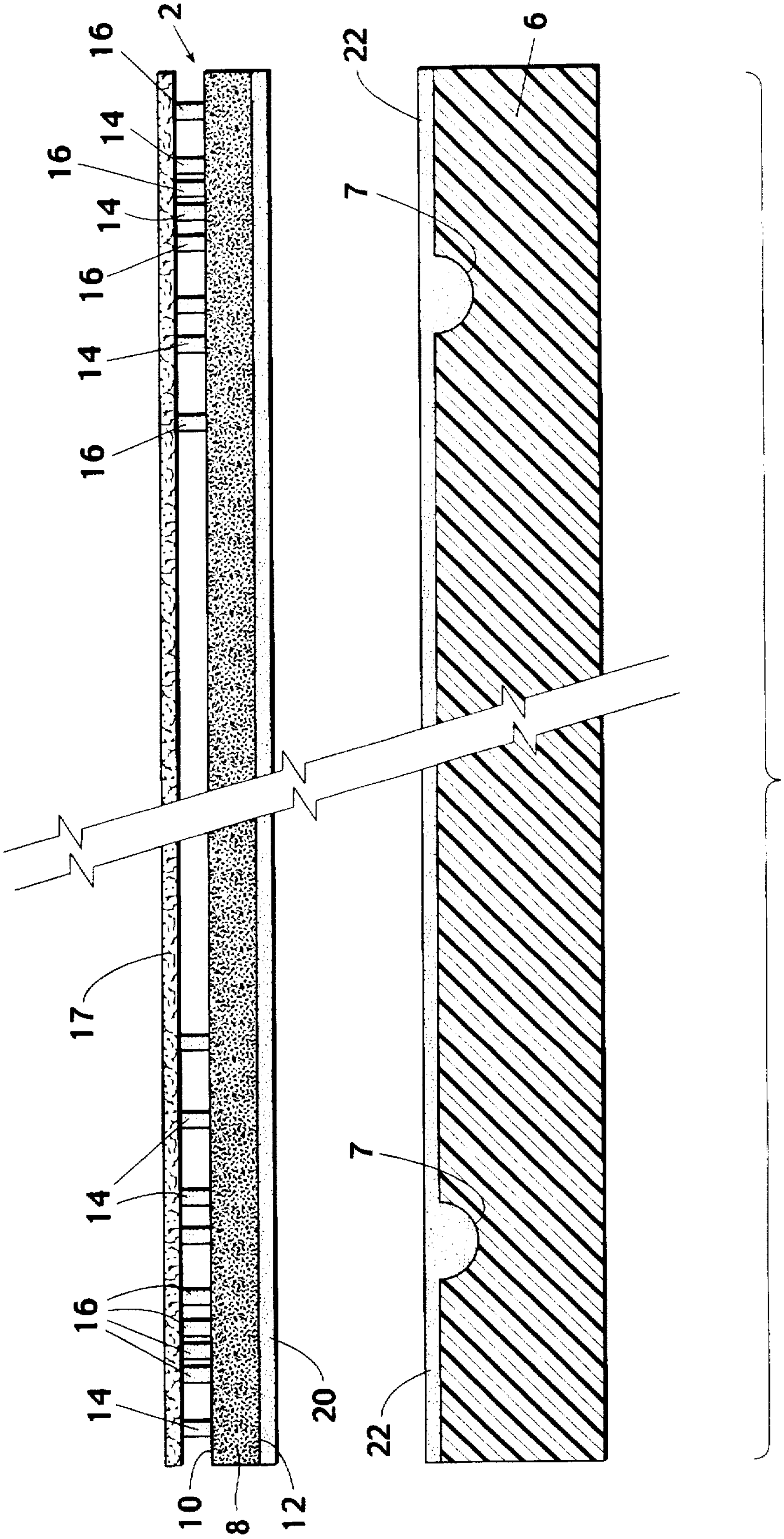
FIG. 2 illustrates a cross-section of a coating of the invention.

The coating 2, as shown in FIG. 2, comprises a sheet of PVC plastics material 8 which, in this case, is of a color linked to the effect to be provided. In this case, the sheet 8 is brown as a wood grain effect is required. The sheet 8 has a front surface 10 on which the wood grain effect is to be produced and a rear surface 12 which is to be adhered to the door 4.

To the front surface 10 is applied a first ink pattern 14 by a conventional screen, litho, flexo or inkjet printing technique, followed by a second ink pattern 16 again applied by the printing process. The patterns of the inks applied are such as to produce a viewable pattern which creates an external appearance of the wood grain and also the joints between wooden pieces are created as shown, for example, at 9 in FIG. 3. The color of the sheet provides the background color of the wood. Additionally, an ink pattern 11 is applied to produce a shaded area which is located so that the same lies in the indented areas 7 of the door when applied to the same and provides a shaded effect.

When the ink patterns 14, 16, 11 have been applied, the front surface 10 is covered by the application of a protective lacquer 17 and the same is dried to at least a tacky condition by ultraviolet heating. The lacquer serves to protect the ink patterns and increase the durability and resistance to damage of the coated surface.

Figure 3:
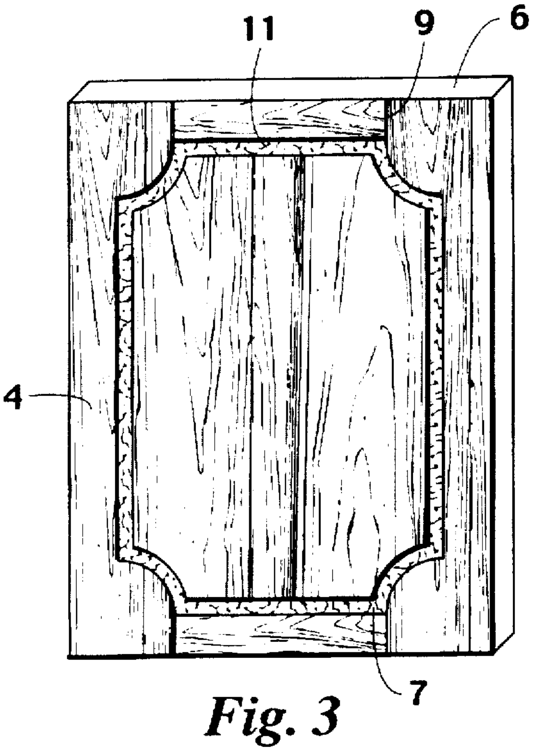
FIG. 3 illustrates a kitchen door, the front surface of which is coated.

A layer of adhesive 20 is applied to the rear surface 12 of the coating either before or after the application of the ink patterns and/or a layer 22 is applied to the door surface. The sheet is then brought into register with the surface to be coated and the sheet is then membrane pressed onto the external surface of the door. The door and the coating are contacted and heat is applied to the same such that the PVC sheet softens and the adhesive memberance is activated. The coating and door are then pressed into a mold and the same ensures that the coating adheres and contacts the surface of the door and particularly the edges thereof to produce a coated door as shown in FIG. 3. The layer of adhesive is any standard adhesive suited to the particular article to which the coating is to be applied. When the coating is to be applied to MDF furniture it is found that the adhesives sold under the trade name HELMIPUR 34331 and 34333 mixed with five percent (5%) hardener Helmitin D is effective.

Typically the adhesive layer can be applied by spray gun and can be applied to either or both of the components prior to the same being pressed together in a mold press. The bonding process used can be either of wet or dry bonding and heat is applied to activate the adhesive.

Typically the press used is a conventional membrane press which are commonly used for applying membranes such as coatings to articles of furniture.

Figure 4:
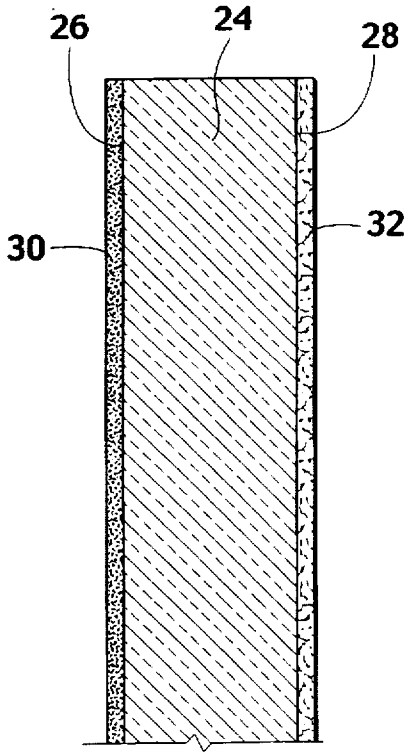
FIG. 4 illustrates a coating in a second embodiment.

FIG. 4 illustrates a second embodiment of coating where the sheet material 24 is transparent. The sheet material has an inner surface 26 which is to be applied to the article to be coated and an outer surface 28. At least one printed pattern 30 is applied to the inner surface 26 and the pattern formed is viewable when looking at the outer surface 28 as the plastics sheet material is transparent. In this embodiment a layer of varnish 32 is applied to the outer surface 28 although equally a further pattern could be printed thereon if required.

In this embodiment, the transparent plastic sheet material allows the patterns applied thereto to be viewable through the same from the other side of the plastics sheet material. This also allows the printed patterns as well as the article which is coated to be protected from damage during subsequent use.

Figure 5:
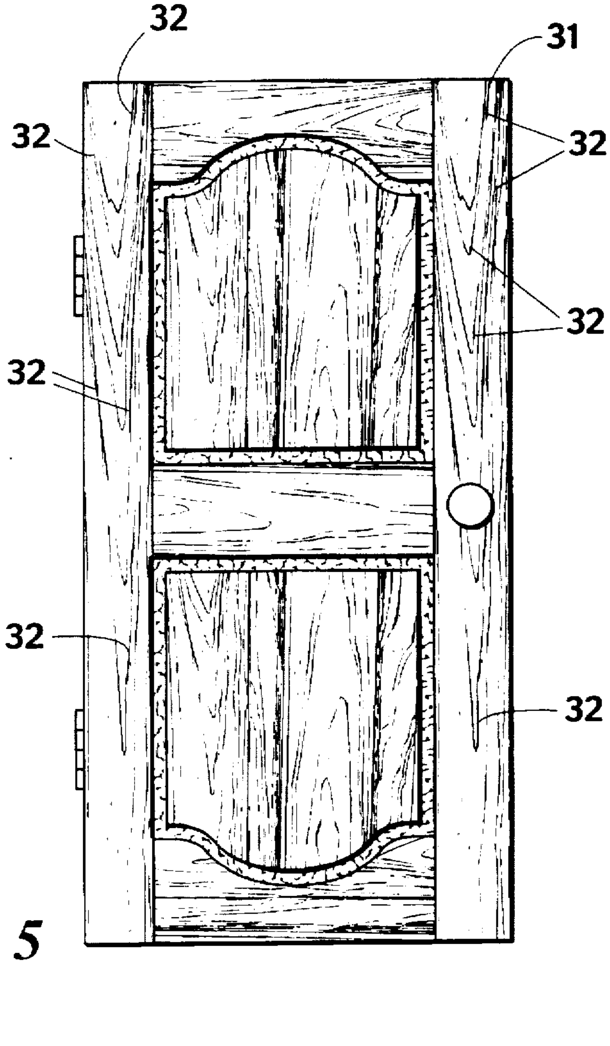
FIG. 5 illustrates an article coated by the coating of FIG. 4.

FIG. 5 illustrates an article, which in this case, is a door 31 which has been coated with a plastics sheet material such as that shown in FIG. 4 with a pattern 30 printed thereon. In this embodiment the color of the material from which the door has been manufactured is used as part of the pattern to enhance the effect created and is viewable through those parts of the coating where the pattern has not been printed. The sheet of plastics material is also provided of a material and of a thickness which allows the same, when applied to the door, to reproduce the shape of indents, grooves and protrusions 32 formed on the surface of the door hence creating, in addition to the visual effect created by the printing of patterns, a tactile effect through the impression of the grooves and indents in the coating.

The coating and method of preparing the same according to the invention allows articles to be coated using a process which is less complex than the known art and which allows a reduction in the coating material which is required to be used. However, and at the same time, the range of surface effects which can be produced on the coating are substantially greater than with known coating in that the range of surface effects which can be applied by printing the same onto a plastics sheet of the required color are extensive and can be adapted to suit specific requirements.

A further advantageous aspect of the invention is that the coating is hard wearing and is resistant to damage by wear or impact of objects thereon. The provision of a protective layer of material over the ink pattern ensures that the same is not affected by impact or wear and the plastics sheet material is also protective of the material from which the article is manufactured. The coating can therefore be used for the protection of articles in addition to the aesthetic advantages obtained.

Whereas, the present invention has been described in relation to the drawings attached hereto, it should be understood that other and further modifications, apart from those shown or suggested herein, may be made within the spirit and scope of this invention.

What is claimed is:

1. A three dimensional article of furniture, which article comprises:

a rigid base with at least one surface area of known dimension said area having multiple contour changes;

a sheet of plastics material having a first planar surface to be applied to a surface of said base including said multiple contour changes and a second planar surface, said contour changes and said known dimension form a three dimensional surface area prior to application of said plastics sheet;

an ink pattern applied to at least one said planar surface of said sheet;

a layer of adhesive applied to said first planar surface of said plastics sheet to adhere said sheet to the surface area to form the coating therefor; and wherein said ink pattern is applied to at least one said planar surface of the sheet material over an area determined by said known dimension of the surface area of the base, said ink pattern in register with the surface area of the base including said contour changes and said ink pattern has at least one change in register with at least one said contour change.

2. An article according to claim 1 wherein a plurality of different ink patterns are applied to said planar surface of the sheet material to create a viewable pattern thereon.

3. An article according to claim 1 including a protective layer of transparent material applied to said second surface of the sheet material.

4. An article according to claim 1 wherein said plastics sheet material has a thickness of between 200–500 microns.

5. An article according to claim 4 wherein said sheet material is composed either of PVC or styrene.

6. An article according to claim 1 wherein said sheet material is transparent.

7. An article according to claim 1 wherein said ink patterns are applied to both of the planar surfaces of the sheet material.

8. An article of furniture as set forth in claim 1 wherein said plastic sheet is embossed to produce a tactile effect.

9. A three dimensional article of furniture, which article comprises:

a rigid base with at least one surface area of known dimension, said area having multiple contour changes;

a sheet of plastics material having a first planar surface to be applied to a surface of said base including said multiple contour changes and a second planar surface, said contour changes and said known dimension form a three dimensional surface area prior to application of said plastics sheet;

an ink pattern applied to at least one said planar surface of said sheet;

a layer of adhesive applied to said base including said multiple contour changes to adhere said first planar surface of said sheet to the base to form the coating therefor; and wherein said ink pattern is applied to at least one said planar surface of the sheet material over an area determined by said known dimension of the surface area of the bases said ink pattern in register with the surface area of the base including said contour changes and said ink pattern has at least one change in register with at least one said contour change.

10. An article according to claim 9 wherein a plurality of different ink patterns are applied to said planar surface of the sheet material to create a viewable pattern thereon.

11. An article according to claim 9 including a protective layer of transparent material applied to said second surface of the sheet material.

12. An article according to claim 9 wherein said plastics sheet material has a thickness of between 200–500 microns.

13. An article according to claim 12 wherein said material is composed either of PVC or styrene.

* * * * *

UNITED STATES PATENT AND TRADEMARK OFFICE

CERTIFICATE OF CORRECTION

PATENT NO. : 5,750,240

DATED : May 12, 1998

INVENTOR(S) : Philip Findley et al.

It is certified that error appears in the above-indentified patent and that said Letters Patent is hereby corrected as shown below:

Col. 5, line 22, after "dimension" insert a --,--; and

Col. 6, line 33, delete "bases" and substitute --base,-- therefore.

Signed and Sealed this

FourthDay of August, 1998

Attest:

BRUCE LEHMAN

Attesting Officer

*Commissioner of Patents and Trademarks*